US011466336B2

(12) United States Patent
Seo et al.

(10) Patent No.: US 11,466,336 B2
(45) Date of Patent: Oct. 11, 2022

(54) HIGH-STRENGTH STEEL SHEET HAVING EXCELLENT BURRING WORKABILITY IN LOW TEMPERATURE RANGE AND MANUFACTURING METHOD THEREFOR

(71) Applicant: POSCO, Pohang-si (KR)

(72) Inventors: Seok-Jong Seo, Gwangyang-si (KR); Sung-Il Kim, Gwangyang-si (KR); Hyun-Taek Na, Gwangyang-si (KR)

(73) Assignee: POSCO, Gyeongsangbuk-Do (KR)

( * ) Notice: Subject to any disclaimer, the term of this patent is extended or adjusted under 35 U.S.C. 154(b) by 319 days.

(21) Appl. No.: 16/467,762

(22) PCT Filed: Nov. 30, 2017

(86) PCT No.: PCT/KR2017/013941
§ 371 (c)(1),
(2) Date: Jun. 7, 2019

(87) PCT Pub. No.: WO2018/117470
PCT Pub. Date: Jun. 28, 2018

(65) Prior Publication Data
US 2020/0071786 A1    Mar. 5, 2020

(30) Foreign Application Priority Data

Dec. 19, 2016 (KR) .................. 10-2016-0173445

(51) Int. Cl.
*C21D 9/46* (2006.01)
*B32B 15/01* (2006.01)
(Continued)

(52) U.S. Cl.
CPC .............. *C21D 9/46* (2013.01); *B32B 15/013* (2013.01); *C21D 6/002* (2013.01); *C21D 6/005* (2013.01);
(Continued)

(58) Field of Classification Search
CPC .................................................. C21D 2211/05
See application file for complete search history.

(56) References Cited

U.S. PATENT DOCUMENTS 4,502,897 A    3/1985   Morita et al.
2006/0081312 A1   4/2006   Yokoi et al.
(Continued)

FOREIGN PATENT DOCUMENTS

CN    1732279     2/2006
CN    102449181   5/2012
(Continued)

OTHER PUBLICATIONS

CN-102747272-A, Guhui Gao; Qingzhi Shi; Wenli Liu; Zhunli Tan, English Translation obtained from EPO, 2012 (Year: 2012).*
(Continued)

*Primary Examiner* — Anthony J Zimmer
*Assistant Examiner* — Jacob J Gusewelle
(74) *Attorney, Agent, or Firm* — Cantor Colburn LLP

(57) ABSTRACT

Provided is a high-strength steel sheet having excellent burring workability in a low temperature range, which is mainly used for automobile chassis parts such as members, lower arms, wheel disks, etc.; and a manufacturing method therefor.

9 Claims, 1 Drawing Sheet

(51) Int. Cl.

| | |
|---|---|
| *C21D 6/00* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/32* | (2006.01) |
| *C23C 2/02* | (2006.01) |
| *C23C 2/06* | (2006.01) |
| *C23C 2/40* | (2006.01) |

(52) U.S. Cl.
CPC .......... *C21D 6/008* (2013.01); *C21D 8/0205* (2013.01); *C21D 8/0226* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C23C 2/02* (2013.01); *C23C 2/06* (2013.01); *C23C 2/40* (2013.01); *C21D 2211/001* (2013.01); *C21D 2211/008* (2013.01)

(56) References Cited

U.S. PATENT DOCUMENTS

| | | | |
|---|---|---|---|
| 2010/0108201 | A1 | 5/2010 | Yokoi et al. |
| 2012/0125724 | A1 | 5/2012 | Yamauchi et al. |
| 2013/0337287 | A1 | 12/2013 | Hirata et al. |
| 2013/0340898 | A1* | 12/2013 | Takashima .............. C22C 38/04 148/333 |
| 2014/0000766 | A1 | 1/2014 | Maeda et al. |
| 2014/0230970 | A1 | 8/2014 | Perlade et al. |
| 2014/0305550 | A1 | 10/2014 | Ariga et al. |
| 2015/0099139 | A1* | 4/2015 | Rijkenberg ............. C22C 38/14 72/47 |
| 2015/0292054 | A1 | 10/2015 | Kami et al. |
| 2015/0368739 | A1 | 12/2015 | Nakajima et al. |

FOREIGN PATENT DOCUMENTS

| | | |
|---|---|---|
| CN | 102747272 A * | 10/2012 |
| CN | 103415641 | 11/2013 |
| CN | 103917680 | 7/2014 |
| CN | 104968820 | 10/2015 |
| JP | 06049591 | 2/1994 |
| JP | 06293910 | 10/1994 |
| JP | 07278731 | 10/1995 |
| JP | 09241790 | 9/1997 |
| JP | 2003096535 | 4/2003 |
| JP | 2003321726 | 11/2003 |
| JP | 2003321732 | 11/2003 |
| JP | 2004244651 | 9/2004 |
| JP | 2006265583 | 10/2006 |
| JP | 2011012308 | 1/2011 |
| JP | 2012001775 | 1/2012 |
| JP | 2012193452 | 10/2012 |
| JP | 2013227597 | 11/2013 |
| JP | 2015147961 | 8/2015 |
| KR | 20090115877 | 11/2009 |
| KR | 101019791 | 3/2011 |
| KR | 20130116329 | 10/2013 |
| KR | 20130135972 | 12/2013 |
| KR | 20140138854 | 12/2014 |
| KR | 20150075541 | 7/2015 |
| KR | 101630977 | 6/2016 |
| KR | 20160078838 | 7/2016 |
| KR | 101657835 | 9/2016 |
| WO | 2015118864 | 8/2015 |

OTHER PUBLICATIONS

International Search Report—PCT/KR2017/013941 dated Mar. 6, 2018.
European Search Report—European Application No. 17882700.2 dated Sep. 16, 2019, citing US 2015/368739, US 2014/305550, KR 2015 0075541, KR 101 630 977 and KR 101 657 835.
Japanese Office Action—Japanese Application No. 2019-532778 dated Oct. 6, 2020, citing JP 2003-321726, JP 2013-227597, WO 2015/118864, JP 2006-265583, and JP 2012-193452.
Chinese Office Action—Chinese Application No. 201780076714.2 dated Jun. 29, 2020, citing CN 1732279, CN 103415641, KR 10-2009-0115877, CN 104968820, CN 103917680, KR 10-1630977, KR 10-1657835, KR 10-2013-0116329, JP 2011-12308, JP 2003-96535, JP 2003-321726, JP 2015-147961, CN 102449181, and JP 2003-321732.

* cited by examiner

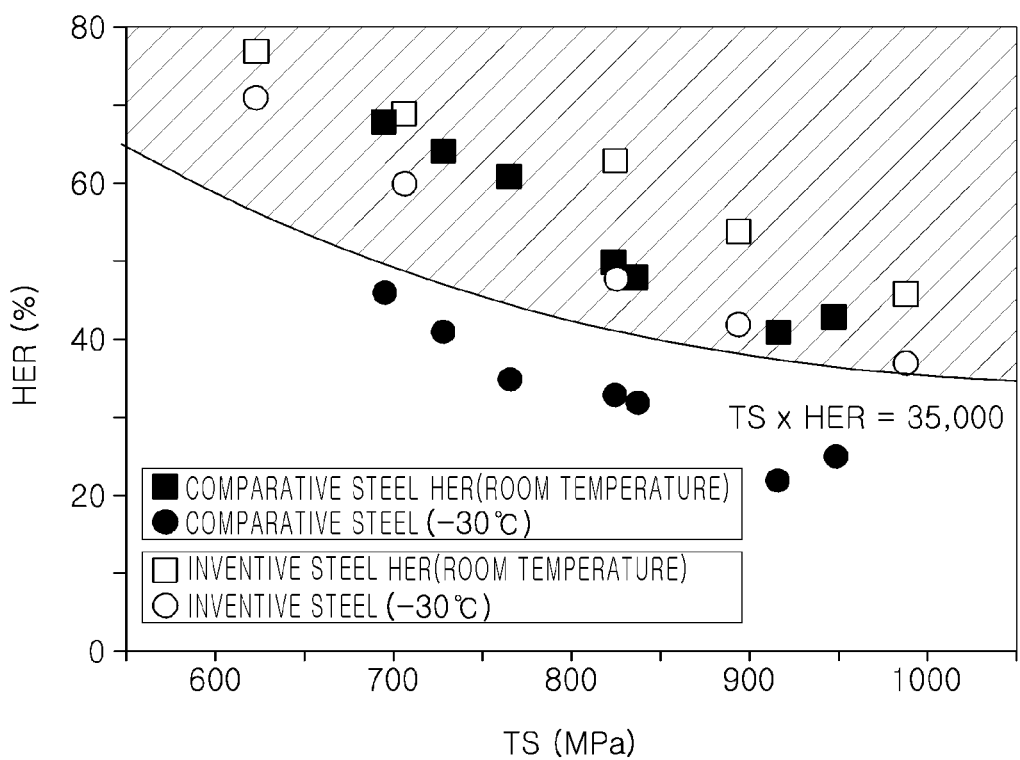

HIGH-STRENGTH STEEL SHEET HAVING EXCELLENT BURRING WORKABILITY IN LOW TEMPERATURE RANGE AND MANUFACTURING METHOD THEREFOR

TECHNICAL FIELD

The present disclosure relates to a high-strength steel sheet mainly used for members of an automobile chassis component, a lower arm, a wheel disc, and the like. More particularly, the present disclosure relates to a high-strength steel sheet having excellent burring properties in a low-temperature region.

BACKGROUND ART

A high-strength steel sheet (a hot-rolled steel sheet) for a vehicle chassis component according to a related art was manufactured using ferrite-bainite two-phase composite structure steel to improve stretch flangeability or using a ferrite-martensite two-phase composite structure steel to improve strength and ductility simultaneously.

For example, in Patent Document 1, a steel sheet is maintained in a ferrite transformation region for several seconds immediately after hot-rolling the steel sheet under specific cooling conditions, and then coiled in a bainite formation temperature region in order to form bainite. Thus, a metallic structure (a microstructure) is formed as a mixed ferrite and bainite structure to secure strength and stretch flangeability simultaneously.

In a method disclosed in Patent Documents 2 to 4, a steel slab is hot-rolled based on a Si—Mn or Mn—P—Cr composition system. The hot-rolled steel sheet is maintained in a ferrite transformation region for several seconds, and is then controlled to be a martensite transformation initiation temperature (Ms) or lower. In a method disclosed in Patent Document 5, a steel sheet is also maintained in a ferrite transformation region for several seconds by using a Si—Mn—Cr or Si—Mn—Cr—Mo based composition system, and is then coiled at a temperature of a martensite transformation initiation temperature (Ms) or higher. According to the above methods, ferrite-martensite complex structure steel, having excellent strength and ductility, was manufactured.

However, such ferrite-martensite two-phase composite structure steel is actually deteriorated in stretch flangeability to be limited for use in a vehicle chassis component required to have the stretch flangeability.

It is known that silicon (Si), manganese (Mn), aluminum (Al), molybdenum (Mo) and the like, alloy components mainly used to manufacture steel having a ferrite-bainite two-phase composite structure, are effective in improving strength and stretch flangeability of the steel. However, when a large amount of the above alloying components is added to improve such physical properties, segregation of the alloying component and inhomogeneous of a microstructure occurs.

In detail, hardenability of steel is rapidly increased during cooling to sensitively change a microstructure depending on cooling conditions. Thus, a second-phase fraction is significantly increased depending on a position (or a portion) of a steel sheet, and stretch flangeability is significantly deteriorated in a low-temperature region.

Moreover, when an alloying component is inappropriately used to improve physical properties of steel even if the steel includes a ferrite single phase rather than a second-phase, a precipitation particle is excessively formed on grain boundary or a fine carbide is formed on the grain boundary to significantly reduce stretch flangeability in a low-temperature region. Accordingly, temperature dependency is increased during forming and productivity is lowered to cause economical disadvantages.

(Patent Document 1) Japanese Laid-Open Patent Publication No. 1994-293910
(Patent Document 2) Japanese Laid-Open Patent Publication No. 1995-278731
(Patent Document 3) Japanese Laid-Open Patent Publication No. 1997-241790
(Patent Document 4) Japanese Laid-Open Patent Publication No. 1994-049591
(Patent Document 5) U.S. Pat. No. 4,502,897

DISCLOSURE

Technical Problem

An aspect of the present disclosure is to provide a high-strength steel sheet having excellent burring properties through optimization of an alloying composition and manufacturing conditions, and a method of manufacturing the same.

Technical Solution

According to an aspect of the present disclosure, a high-strength steel sheet having excellent burring properties in a low temperature range, includes, by wt %, carbon (C): 0.02 to 0.10%, silicon (Si): 0.01 to 0.30%, manganese (Mn): 1.0 to 1.7%, aluminum (Al): 0.01 to 0.10%, chromium (Cr): 0.005 to 0.2%, molybdenum (Mo): 0.005 to 0.3%, phosphorus (P): 0.001 to 0.05%, sulfur (S): 0.001 to 0.01%, nitrogen (N): 0.001 to 0.01%, niobium (Nb): 0.005 to 0.06%, titanium (Ti): 0.005 to 0.13%, vanadium (V): 0.005 to 0.2%, boron (B): 0.0003 to 0.002%, and a balance of iron (Fe) and inevitable impurities,

[C]*, expressed by Relational Expression 1, satisfies −0.015 to 0.015,

Mn, Mo, Cr, and B satisfy Relational Expression 2, $$[C]^* = [C] - ([C] \times A) \quad \text{(Relational Expression 1)}$$

where $A = (([Nb]/93) + ([Ti]/48) + ([V]/51) + ([Mo]/96))/([C]/12)$, and each alloying component denotes a content by wt %, $$[Mn] + (2.8[Mo]) + (1.5[Cr]) + (500[B]) \leq 2.5 \quad \text{(Relation Expression 2)}$$

where each alloying component denotes a content by wt %, a microstructure comprises, by area fraction, 97% or more (including 100%) of a ferrite phase, the number of coarse complex precipitates, containing at least one of Ti, Nb, Mo, and V, each having a diameter of at least 10 μm, observed within a unit area of 1 cm$^2$, is 1×10$^7$ or less, and the number of austenitic phases, each having a diameter of 10 μm or more, observed from grain boundaries within a unit area of 1 cm$^2$, is 1×10$^4$ or less.

According to another aspect of the present disclosure, a method of manufacturing a high-strength steel sheet, having excellent burring properties in a low temperature range, includes reheating a steel slab, satisfying the above-described alloying composition and Relational Expressions 1 and 2, within a temperature range from 1200 to 1350° C., finish-hot-rolling the reheated steel slab within a temperature range from 850 to 1150° C. to manufacture a hot-rolled steel sheet, cooling the hot-rolled steel sheet to a temperature ranging from 550 to 700° C. at an average cooling rate of 10 to 70° C./s, coiling the cooled hot-rolled steel sheet within a temperature range from 550 to 700° C., and forced-cooling the hot-rolled steel sheet at a cooling rate of 0.01 to 10° C./s after coiling.

Advantageous Effects

According to the present disclosure, a steel sheet having excellent burring properties not only in a room-temperature region but also in a low-temperature region may be provided. The steel sheet may be appropriately applied to a material, having excellent strength and excellent stretch flangeability, such as a vehicle chassis component, or the like.

DESCRIPTION OF DRAWINGS

FIG. 1 is a graph illustrating HER (%)×TS(MPa) values in a room-temperature region and a low-temperature region of invention steels according to an example embodiment in the present disclosure and comparative steels.

BEST MODE FOR INVENTION

The inventors have conducted intensive research into influences of an alloying composition and a microstructure when burring properties are secured in a room-temperature region and a low-temperature region of a hot-rolled steel sheet. According to the intensive research, the present inventors confirmed that a high-strength steel sheet having excellent burring properties in a room-temperature region and a low-temperature region might be provided when inhibiting formation of a coarse precipitate (including a complex precipitate) on a grain boundary and formation of a martensite-austenite (MA) phase mainly observed on the grain boundary. As a result, the present inventors conceived of the present disclosure.

In detail, a technical feature of the present disclosure to provide a high-strength steel sheet having desired physical properties by controlling the number of coarse complex precipitates including at least one of Ti, Nb, Mo, and V, precipitate forming elements in an alloying composition, and controlling a fraction of an MA phase, obtained on a grain boundary, and the number of coarse austenite phases Hereinafter, the present disclosure will be described in detail.

A high-strength steel sheet, having excellent burring properties in a low-temperature range, according to an aspect of the present disclosure may include, by wt %, carbon (C): 0.02 to 0.10%, silicon (Si): 0.01 to 0.30%, manganese (Mn): 1.0 to 1.7%, aluminum (Al): 0.01 to 0.10%, chromium (Cr): 0.005 to 0.2%, molybdenum (Mo): 0.005 to 0.3%, phosphorus (P): 0.001 to 0.05%, sulfur (S): 0.001 to 0.01%, nitrogen (N): 0.001 to 0.01%, niobium (Nb): 0.005 to 0.06%, titanium (Ti): 0.005 to 0.13%, vanadium (V): 0.005 to 0.2%, and boron (B): 0.0003 to 0.002%.

Hereinafter, the reason for limiting the alloy composition of the high-strength steel sheet of the present disclosure as described above will be described in detail. In the following description, the content of each element is given in wt % unless otherwise specified.

C: 0.02 to 0.10%

Carbon (C) is an element most economical and effective in strengthening steel. When a content of C is increased, a precipitation strengthening effect or a fraction of a bainite phase may be increased to improve tensile strength.

When the content of C is less than 0.02%, it may be difficult to achieve a sufficient precipitation strengthening effect. Meanwhile, when the content of C is greater than 0.10%, a coarse carbide may be formed by excessive carbon (C) or MA phases (a martensite phase and an austenite phase) may be formed in the case in which a cooling rate is high during cooling to a coiling temperature after hot-rolling, and thus, strength may be excessively increased, formability and impact resistance characteristics may be lowered, and weldability may be deteriorated.

Therefore, the content of C may be controlled to be within a range, in detail, from 0.02 to 0.10%. More advantageously, C may be contained in amount of, in detail, 0.03 to 0.08%.

Si: 0.01 to 0.30%

Silicon (Si) has a deoxidizing effect on molten steel and a solid-solution strengthening effect, and improves formability by delaying the formation of coarse carbides.

When a content of Si is less than 0.01%, an effect of delaying formation of a carbide may be low, and thus, it may be difficult to improve formability. Meanwhile, when the content of Si is greater than 0.30%, a red scale may be formed on a surface of a steel sheet by Si during hot rolling, and thus, surface quality may be significantly deteriorated and ductility and weldability are lowered.

Therefore, the content of Si may be controlled to be within a range, in detail, from 0.01 to 0.30%. More advantageously, Si may be contained in amount of, in detail, 0.01 to 0.20%.

Mn: 1.0 to 1.7%

Similarly to Si, manganese (Mn) is an element in strengthening solid solution of steel.

However, when a content of Mn is less than 1.0%, the above effect may not be sufficiently obtained by addition of Mn. Meanwhile, when the content of Mn is greater than 1.7%, the solid-solution strengthening effect may be excessively increased to lower ductility. Additionally, a segregated portion may be significantly developed in a thickness center region during slab casting in a continuous casting process, and an inhomogeneous microstructure may be formed in a thickness direction during cooling after hot rolling, and thus, stretch flangeability of a steel sheet may be deteriorated.

Therefore, the content of Mn may be controlled to be within a range, in detail, from 1.0 to 1.7%. More advantageously, Mn may be contained in amount of, in detail, 1.0 to 1.4%.

Al: 0.01 to 0.10%

Aluminum (Al) is generally added for deoxidation.

When a content of Al is less than 0.01%, the above effect may not be sufficiently achieved. Meanwhile, when the content of Al is greater than 0.10%, Al may combine with nitrogen to form AlN, and thus, there may be increasing possibility of corner cracking in a slab in a continuous casting process and increasing possibility of defects caused by formation of inclusions.

Therefore, the content of Al may be controlled to be within a range, in detail, from 0.01 to 0.10%.

Cr: 0.005 to 0.2%

Chromium (Cr) is an element effective in strengthening solid solubility of steel and improving strength of the steel.

When a content of Cr is less than 0.005%, a strength improving effect, achieved by Cr, may not be sufficiently achieved. Meanwhile, when the content of Cr is greater than 0.2%, elongation may be deteriorated. Additionally, similar to Mn, a segregated portion may be significantly developed in a thickness center region and an inhomogeneous microstructure may be formed in a thickness direction to deteriorate stretch flangeability of a steel sheet.

Therefore, the content of Cr may be controlled to be within a range, in detail, from 0.005 to 0.2%. More advantageously, Cr may be contained in amount of, in detail, 0.005 to 0.1%.

Mo: 0.005 to 0.3%

Molybdenum (Mo) has an excellent solid-solution strengthening effect and, when added together with titanium (Ti) and vanadium (V), may form (TiMoV)C to significantly contribute to precipitation strengthening.

To sufficiently achieve the above effects, Mo may be added in amount of, in detail, 0.005% or more. However, the precipitation strengthening effect of Mo may be less than that of Ti, Nb, V, and the like. When the content of Mo is greater than 0.3%, weldability may be deteriorated and economical disadvantage may occur.

Therefore, the content of Mo may be controlled to be within a range, in detail, from 0.005 to 0.3%. More advantageously, Mo may be contained in amount of, in detail, 0.01 to 0.25%.

P: 0.001~0.05%

Similarly to Si, phosphorus (P) is an element having both a solid-solution strengthening effect and an effect of facilitating ferrite transformation.

However, when a content of P is less than 0.001%, economical disadvantage may occur due to high manufacturing costs and it may be disadvantageous to obtain sufficient strength of a steel sheet. Meanwhile, when the content of P is greater than 0.05%, embrittlement may be caused by segregation of grain boundaries, fine cracking may easily occur during a forming process, and ductility and impact resistance characteristics may be deteriorated.

Therefore, the content of P may be controlled to be within a range, in detail, from 0.001% to 0.05%.

S: 0.001~0.01%

Sulfur (S) is an impurity present in steel. When a content of S is greater than 0.01%, S may combine with Mn, or the like, to a non-metallic inclusion. Thus, fine cracking may easily occur during a steel cutting process, and stretch flangeability and impacting resistance characteristics may be significantly deteriorated. Meanwhile, when the content of S is less than 0.001%, it may take a significant amount of time to perform a steelmaking process, and thus, productivity may lowered.

Therefore, the content of S may be limited to a range, in detail, from 0.001 to 0.01%.

N: 0.001 to 0.01%

Together with C, nitrogen (N) is a typical element having a solid-solution strengthening effect and combines with Ti, Al, and the like, to form coarse precipitates.

In general, nitrogen (N) has a greater solid-solution strengthening effect than a solid-solution strengthening effect of C. However, since toughness may be significantly lowered as the content of N in steel is increased, an upper limit of N may be limited to a range, in detail, 0.01%. When the content of N is less than 0.001%, it may take a significant amount of time to perform a steelmaking process, and thus, productivity is reduced.

Therefore, the content of N may be controlled to be within a range, in detail, from 0.001 to 0.01%.

Nb: 0.005 to 0.06%

Together with Ti and V, niobium (Nb) is a typical precipitation strengthening element. During hot rolling, Nb precipitates and delays recrystallization, and thus, a grain refinement effect may be achieved to improve strength and impact toughness of steel.

When a content of Nb is less than 0.005%, the above effects may not be achieved. When the content of Nb is greater than 0.06%, recrystallization may be excessively delayed during hot rolling to form elongated grains and coarse complex precipitates, and thus, stretch flangeability may be deteriorated.

Therefore, the content of Nb may be controlled to be within a range, in detail, from 0.005 to 0.06%. More advantageously, Nb may be contained in amount of, in detail, 0.01 to 0.03%.

Ti: 0.005 to 0.13%

Together with Nb and V, titanium (Ti) is a typical precipitate strengthening element and forms coarse TiN in steel with high affinity with N. TiN has an effect of inhibiting growth of crystal grains during a heat process for hot rolling. Ti, remaining after reacting with N, may be solid-solubilized in the steel and combine with carbon, and thus, a TiC precipitate may be formed to improve strength of the steel.

When a content of Ti is less than 0.005%, the above effects may not be sufficiently achieved. Meanwhile, when the content of Ti is greater than 0.13%, coarse TiN may be formed and a precipitate may be coarsened, and thus, stretch flangeability during a forming process may be deteriorated.

Therefore, the content of Ti may be controlled to be within a range, in detail, from 0.005 to 0.13%. More advantageously, Ti may be contained in amount of, in detail, 0.05 to 0.11%.

V: 0.005 to 0.2%

Together with Nb and Ti, vanadium (V) is a typical precipitation strengthening element and may form a precipitate, after coiling, to be effective in improving strength of steel.

When a content of V is less than 0.005%, the above effect may be may not be sufficiently achieved. Meanwhile, when the content of V is greater than 0.2%, a coarse complex precipitate may be formed to deteriorate stretch flangeability and to cause economical disadvantage.

Therefore, the content of V may be controlled to be within a range, in detail, from 0.005 to 0.2%.

B: 0.0003~0.002%

When boron (B) is present in a solid-solubilized state in steel, B may stabilize a grain boundary to improve embrittlement of the steel in a low-temperature region. In addition, since B forms BN together with solid-solubilized N, formation of a coarse nitride may be inhibited.

When a content of B is less than 0.0003%, the above effect may not be sufficiently achieved. Meanwhile, when the content of B is greater than 0.002%, a recrystallization behavior may be delayed during hot rolling and ferrite phase transformation may be delayed, and thus, a precipitation strengthening effect may be reduced.

Therefore, the content of B may be controlled to be within a range, in detail, from 0.0003 to 0.002%.

In the present disclosure, the other component of the high-strength steel sheet is iron (Fe). However, impurities of raw materials or manufacturing environments may be inevitably included in the high-strength steel sheet, and such impurities may not be removed. Such impurities are well-known to those of ordinary skill in manufacturing industries, and thus specific descriptions of the impurities will not be given in the present disclosure.

According to the high-strength steel sheet having excellent burring properties in a low-temperature region and the above-described alloying composition, [C]*, given by Relational Expression 1, may satisfy, in detail, −0.015 to 0.015, and Mn, Mo, Cr, and B may satisfy, in detail, Relational Expression 2.

$$[C]^* = [C] - ([C] \times A) \quad \text{(Relational Expression 1)}$$

(where $A = (([Nb]/93) + ([Ti]/48) + ([V]/51) + ([Mo]/96))/([C]/12)$, and each alloying component denotes a content by wt %)

$$[Mn] + (2.8[Mo]) + (1.5[Cr]) + (500[B]) \leq 2.5 \quad \text{(Relation Expression 2)}$$

(where each alloying component denotes a content by wt %).

In the present disclosure, excellent burring properties of a provided steel sheet in a room-temperature region and a low-temperature region may be secured by controlling Relational Expression 1.

In further detail, when a value of Relational Expression 1 ([C]*) is less than −0.015, the number of coarse complex precipitates, disadvantageous in securing burring properties in a low-temperature region, may be increased. Meanwhile, when the value [C]* is greater than 0.015, carbides may be formed.

Accordingly, by controlling the value [C]* given by Relational Expression 1, low-temperature punching of a steel sheet or occurrence and propagation of cracking in forming may be inhibited to obtain excellent burring properties even in a low-temperature region.

When alloying components Mn, Cr, Mo, and B are excessively added such that a value of Relational Expression 2 is greater than 2.5 even if Relational Expression 1 is satisfactory, ferrite phase transformation is delayed during cooling after hot rolling, and thus, there is increasing probability that an MA phase will be formed in a microstructure. In this case, burring properties may be deteriorated in a room-temperature region and a low-temperature region.

Therefore, to control a fraction of the MA phase, component relationships between Mn, Cr, Mo, and B may be limited to Relational Expression 2 and values thereof may be controlled to be 2.5 or less. As a result, a steel sheet having target physical properties may be provided.

A high-strength steel sheet according to the present disclosure, satisfying the above-described allying composition and Relational Expressions 1 and 2, includes a ferrite phase having an area fraction of 97% or more (including 100%), and the number of coarse complex precipitates, including at least one of Ti, Nb, Mo, and V, each having a diameter of 10 μm or more, observed within a unit area of 1 cm², may satisfy $1 \times 10^7$ or less, and the number of austenite phases, each having a diameter of 10 μm or more, observed on grain boundaries within a unit area of 1 cm², may satisfy $1 \times 10^4$ or less. Here, the austenite phases refer to austenite phases constituting MA phases.

As described above, a steel sheet according to the present disclosure, having excellent burring properties in a room-temperature region and a low-temperature region, may be provided by inhibiting formation of coarse austenite phases while forming a fine complex precipitate.

Further, a high-strength steel sheet according to the present disclosure may include MA phases in addition to ferrite phases. In this case, the MA phases may be controlled to have an area fraction less than 3% (including 0%). As described above, this is because burring properties in a room-temperature region and a low-temperature region is deteriorated as a fraction of the MA phase is increased.

An average grain size of the ferrite phase (based on an equivalent circular diameter) may satisfy, in detail, 3 to 20 μm.

When the average grain size of the ferrite phase is less than 3 μm, yield strength of steel may be significantly increased to be disadvantages in forming. When the average grain size of the ferrite phase is greater than 20 μm, impact toughness may be reduced to increase inhomogeneous of a microstructure. Accordingly, since occurrence of cracking may also be increased in a low-temperature region during punching, burring properties in the low-temperature region may be deteriorated.

As described above, a steel sheet according to the present disclosure, satisfying an alloying composition, relational expressions, and a microstructure, may secure excellent burring properties in a low-temperature region because tensile strength is 590 MPa or more and a product of a hole expanding ratio (HER) and tensile strength (HER (%)×TS (MPa)) is 35000 MPa·% or more at a temperature of −30° C.

Hereinafter, a method of manufacturing a high-strength steel sheet having excellent burring properties in a low-temperature region, another aspect of the present disclosure, will be described in detail.

In brief, a high-strength steel sheet according to present disclosure may be manufactured through steps of steel slab reheating, hot rolling, cooling, coiling, and cooling (forced cooling). Hereinafter, conditions of the respective steps will be described in detail.

Reheating

A steel slab, satisfying the above-described alloying composition and Relational Expressions 1 and 2, is prepared. The prepared steel slab may be reheated within a temperature range, in detail, from 1200 to 1350° C.

When a reheating temperature is less than 1200° C., a precipitate is not sufficiently solid-solubilized again, and thus, formation of precipitates may be decreased in subsequent processes following hot rolling and even coarse TiN may remain. Meanwhile, when the reheating temperature is greater than 1350° C., strength may be lowered by abnormal grain growth of austenite grains.

Accordingly, the steel slab may be reheated at a temperature ranging, in detail, from 1200 to 1350° C.

Hot Rolling

In detail, the reheated steel slab may be hot-rolled to manufacture a hot-rolled steel sheet. In this case, finish hot rolling may be performed within a range, in detail, from 850 to 1150° C.

When the temperature is less than 850° C. during the finish hot rolling, crystal grains, elongated by recrystallization delay, may be developed to increase anisotropy of strength and ductility and to deteriorate formability. Meanwhile, when the temperature is greater than 1150° C. during the finish hot rolling, a temperature of the hot-rolled steel sheet may be significantly increased to coarsen a grain size and to deteriorate surface quality.

Therefore, a temperature range of the finish hot rolling may be controlled to be, in detail, 850 to 1150° C. when the reheated steel slab is hot-rolled.

Cooling and Coiling

The manufactured hot-rolled steel sheet is cooled to a temperature ranging from 550 to 700° C. The cooled hot-rolled steel sheet may be coiled within, in detail, the temperature range.

When the hot-rolled steel sheet is cooled to a temperature less than 550° C. and is then coiled, a bainite phase may be unnecessarily formed in steel to significantly reduce a precipitation strengthening effect. Additionally, an MA phase may be formed to deteriorate burring properties in a low-temperature region. Meanwhile, when the cooling and coiling temperature is greater than 700° C., ferrite grains may be coarsened and formation of a coarse carbide may be facilitated, and thus, it may be difficult to secure strength of steel and the burring property may be deteriorated.

Therefore, the hot-rolled steel sheet may be cooled to a temperature ranging, in detail, from 550 to 700° C. and is then subjected to a coiling process. During the cooling, an average cooling rate may satisfy, in detail, 10 to 70° C./s.

When the average cooling rate is less than 10° C./s, crystal grains of the ferrite phase may be coarsened and a microstructure may become inhomogeneous. Meanwhile, when the average cooling rate is greater than 70° C./s, formation of the martensite may be facilitated to deteriorate burring properties of steel in a low-temperature range.

Therefore, the average cooling rate may be controlled to be within a range, in detail, from 10 to 70° C./s during cooling to a target temperature after hot rolling.

Cooling (Forced Cooling)

The coiled hot-rolled steel sheet may be forced-cooled at a cooling rate of, in detail, 0.01 to 10° C./s. In this case, the forced cooling may be started, in detail, within three hours immediately after the coiling is completed.

When the coiled hot-rolled steel sheet is maintained for three hours or more at the temperature of 550° C. or more, a size of a precipitate in steel may be coarsened to deteriorate the burring property in a low-temperature region. Therefore, the cooling may be performed within, in detail, three hours immediately after the coiling. The cooling may be performed within, in further detail, two hours immediately after the cooling. The cooling may be performed within, in much further detail, an hour immediately after the cooling in a temperature range from a room temperature to 550° C.

When the cooling rate is greater than 10° C./s, an MA phase may be formed during the cooling. In this case, there is high probability that burring properties in a low-temperature region will be deteriorated. Meanwhile, when the cooling rate is less than 0.01° C./s, a locally coarse precipitate may be formed to deteriorate burring properties in a low-temperature region.

A method of performing forced cooling at such a cooling rate is not limited, but the forced cooling may be performed using, in detail, air blasting, mist, coolant, or the like. On the other hand, when air cooling is performed during the cooling, the cooling rate may not be secured. Therefore, in detail, the air cooling may be excluded.

Following completion of the above-described cooling (forced cooling), the method may further include pickling the hot-rolled steel sheet and oiling the pickled hot-rolled steel sheet.

Following the pickling, the method may further include performing hot-dip galvanizing after the steel sheet is heated to a temperature ranging from 450 to 740° C. In this case, the hot-dip galvanizing may be performed in a plating bath including, by wt %, magnesium (Mg): 0.01 to 30%, aluminum (Al): 0.01 to 50%, and a balance of zinc (Zn), but performing the hot-dip galvanizing is not limited thereto.

Hereinafter, the present disclosure will be described more specifically through examples. However, the following examples should be considered in a descriptive sense only and not for purposes of limitation. The scope of the present invention is defined by the appended claims, and modifications and variations may be reasonably made therefrom.

MODE FOR INVENTION

Embodiment

A hot-rolled steel sheet was manufactured by preparing steel slabs having alloying compositions listed in Table 1, reheating each of the steel slabs at a temperature of 1200 to 1350° C., and hot-rolling the reheated steel slabs. After cooling the hot-rolled steel sheet to a coiling temperature, listed in Table 2, at a cooling rate of 20 to 30° C./s and coiling the cooled hot-rolled steel sheet, forced cooling was started within an hour immediately after the coiling. Finish rolling temperatures in the hot rolling and cooling rates in forced cooling are listed in Table 2. The forced cooling was performed using an argon (Ar) gas to uniformly cool the hot-rolled steel sheet.

Mechanical properties, HERs in a room-temperature region and a low-temperature region, and a microstructure of each forced-cooled hot-rolled steel sheet were measured and listed in Table 3.

In this case, 0.2% off-set yield strength (YS), tensile strength (TS), and elongation at fracture (T-El) were measured after preparing a JIS-5 standard specimen in a direction perpendicular to a rolling direction. The HERs in a room-temperature region and a low-temperature region were performed based on JFST 1001-1996 standard. After the HERs were performed three times, an average thereof was calculated and listed. The HER in a low-temperature region indicated a result obtained by performing all initial hole punching and hole expanding tests at a temperature of −30° C.

Precipitates, formed on grain boundaries in steel, used a field emission scanning electron microscope (FE-SEM) and energy dispersive spectroscopy (EDS) and results, observed at a magnification of 1000 to 3000, are listed. MA phases were analyzed at a magnification of 1000 with an optical microscope after LePera etching, austenite phases were distinguished using electron backscattered diffraction (EBSD), and results, analyzed at a magnification of 3000, are listed.

TABLE 1

| Steel Type | Alloying Composition (wt %) | | | | | | | | | | | | | Relational Expression 1 | Relational Expression 2 |
|---|---|---|---|---|---|---|---|---|---|---|---|---|---|---|---|
| | C | Si | Mn | Cr | Al | P | S | N | Mo | Ti | Nb | V | B* | | |
| CS1 | 0.06 | 0.02 | 1.1 | 0.01 | 0.03 | 0.01 | 0.003 | 0.004 | 0.05 | 0.08 | 0.03 | 0.005 | 5 | 0.029 | 1.51 |
| CS2 | 0.07 | 0.01 | 1.2 | 0.03 | 0.03 | 0.01 | 0.003 | 0.004 | 0.07 | 0.08 | 0.04 | 0.005 | 5 | 0.035 | 1.69 |
| CS3 | 0.05 | 0.2 | 1.6 | 0.1 | 0.05 | 0.01 | 0.003 | 0.004 | 0.2 | 0.08 | 0.05 | 0.05 | 8 | −0.013 | 2.71 |
| CS4 | 0.045 | 0.5 | 1.4 | 0.05 | 0.03 | 0.01 | 0.003 | 0.004 | 0.15 | 0.11 | 0.03 | 0.1 | 4 | −0.029 | 2.10 |
| CS5 | 0.05 | 0.1 | 1.4 | 0.1 | 0.03 | 0.01 | 0.003 | 0.004 | 0.1 | 0.12 | 0.035 | 0.1 | 5 | −0.021 | 2.08 |
| CS6 | 0.05 | 0.3 | 1.6 | 0.15 | 0.03 | 0.01 | 0.002 | 0.004 | 0.25 | 0.12 | 0.030 | 0.05 | 8 | −0.027 | 2.93 |
| CS7 | 0.085 | 0.2 | 1.7 | 0.18 | 0.05 | 0.01 | 0.003 | 0.004 | 0.25 | 0.06 | 0.035 | 0.05 | 10 | 0.022 | 3.17 |
| IS1 | 0.03 | 0.05 | 1.2 | 0.01 | 0.03 | 0.0025 | 0.004 | 0.005 | 0.04 | 0.08 | 0.01 | 0.006 | 3 | 0.002 | 1.48 |
| IS2 | 0.04 | 0.15 | 1.2 | 0.01 | 0.03 | 0.01 | 0.003 | 0.004 | 0.01 | 0.11 | 0.02 | 0.007 | 5 | 0.007 | 1.49 |

TABLE 1-continued

| | Alloying Composition (wt %) | | | | | | | | | | | | | Relational | Relational |
|---|---|---|---|---|---|---|---|---|---|---|---|---|---|---|---|
| Steel Type | C | Si | Mn | Cr | Al | P | S | N | Mo | Ti | Nb | V | B* | Expression 1 | Expression 2 |
| IS3 | 0.055 | 0.05 | 1.4 | 0.01 | 0.03 | 0.01 | 0.003 | 0.004 | 0.1 | 0.10 | 0.015 | 0.045 | 5 | 0.005 | 1.95 |
| IS4 | 0.06 | 0.01 | 1.3 | 0.1 | 0.03 | 0.01 | 0.002 | 0.004 | 0.2 | 0.10 | 0.020 | 0.06 | 5 | −0.00 | 2.26 |
| IS5 | 0.08 | 0.2 | 1.3 | 0.01 | 0.03 | 0.01 | 0.003 | 0.004 | 0.25 | 0.13 | 0.020 | 0.1 | 3 | −0.01 | 2.17 |

IS: Inventive Steel/CS: Comparative Steel
(In Table, B* denotes a content by 'ppm'.)

TABLE 2

| | Manufacturing Conditions | | | |
|---|---|---|---|---|
| Steel Type | Finish Hot Rolling Temperature (° C.) | Coiling Temperature (° C.) | Cooling Rate After Coiling (° C./s) | Classification |
| CS 1 | 889 | 615 | 0.11 | CE 1 |
| CS 2 | 903 | 618 | 0.10 | CE 2 |
| CS 3 | 911 | 625 | 0.05 | CE 3 |
| CS 4 | 892 | 610 | 0.05 | CE 4 |
| CS 5 | 887 | 623 | 0.10 | CE 5 |
| CS 6 | 902 | 612 | 0.15 | CE 6 |
| CS 7 | 895 | 622 | 0.10 | CE 7 |
| IS 1 | 899 | 633 | 0.15 | IE 1 |
| IS 2 | 925 | 625 | 0.05 | IE 2 |
| IS 3 | 902 | 626 | 0.06 | IE 3 |
| IS 4 | 898 | 638 | 0.10 | IE 4 |
| IS 5 | 907 | 642 | 0.08 | IE 5 |
| IS 5 | 913 | 627 | 0.001 | CE 8 |
| IS 5 | 895 | 642 | 25 | CE 9 |

IS: Inventive Steel/CS: Comparative Steel
IE: Inventive Example/CE: Comparative Example

TABLE 3

| | Microstructure | | | Mechanical Properties | | | | |
|---|---|---|---|---|---|---|---|---|
| Classification | Number of Complex Precipitates | MA Phase (Fraction %) | Number of Austenite Phases | YS (MPa) | TS (MPa) | T-El (%) | Room Temperature HER (%) | −30° C. HER (%) |
| CE 1 | $4.4 \times 10^6$ | 0.11 | $2.3 \times 10^4$ | 626 | 695 | 23 | 68 | 46 |
| CE 2 | $3.7 \times 10^6$ | 0.07 | $1.8 \times 10^5$ | 675 | 728 | 22 | 64 | 41 |
| CE 3 | $4.2 \times 10^6$ | 0.45 | $3.6 \times 10^4$ | 691 | 765 | 21 | 61 | 35 |
| CE 4 | $8.5 \times 10^7$ | 0.03 | $4.8 \times 10^3$ | 765 | 836 | 20 | 48 | 32 |
| CE 5 | $6.3 \times 10^7$ | 0.04 | $7.2 \times 10^3$ | 774 | 823 | 19 | 50 | 33 |
| CE 6 | $5.1 \times 10^7$ | 0.10 | $2.5 \times 10^4$ | 901 | 947 | 17 | 43 | 25 |
| CE 7 | $3.2 \times 10^6$ | 0.55 | $4.2 \times 10^6$ | 875 | 915 | 18 | 41 | 22 |
| IE 1 | $2.2 \times 10^5$ | 0.02 | $5.6 \times 10^2$ | 572 | 623 | 24 | 77 | 71 |
| IE 2 | $1.5 \times 10^5$ | 0.04 | $2.8 \times 10^3$ | 655 | 706 | 23 | 69 | 60 |
| IE 3 | $7.8 \times 10^4$ | 0.03 | $1.2 \times 10^3$ | 771 | 825 | 21 | 63 | 48 |
| IE 4 | $5.2 \times 10^5$ | 0.05 | $7.2 \times 10^3$ | 855 | 893 | 19 | 54 | 42 |
| IE 5 | $1.7 \times 10^6$ | 0.02 | $3.5 \times 10^3$ | 956 | 987 | 18 | 46 | 37 |
| CE 8 | $4.5 \times 10^7$ | 0.10 | $1.9 \times 10^3$ | 944 | 982 | 18 | 40 | 32 |
| CE 9 | $6.6 \times 10^5$ | 0.55 | $4.8 \times 10^4$ | 938 | 975 | 19 | 42 | 33 | isfied the present disclosure but manufacturing conditions (conditions of forced cooling after coiling) were out of the present disclosure, a desired microstructure might not be obtained. Accordingly, it could be confirmed that burring properties were deteriorated.

More specifically, Comparative Examples 1, 2, 4, and 5 are cases which did not satisfy the condition of Relational Expression 1. In Comparative Examples 1 and 2, a carbide was excessively formed on a grain boundary by residual carbon (C) to deteriorate burring properties in a low-temperature region. This was because, during punching and forming, occurrence and propagation of cracking rapidly proceeded from the carbide present on a grain boundary. In Comparative Examples 4 and 5, Ti, Nb, V, and the like were excessively added as compared to carbon (C), and thus, a large amount of coarse complex precipitates were formed around grain boundaries to deteriorate burring properties in a low-temperature region.

Comparative Example 3 is a case which did not satisfy Relational Expression 2. In the Comparative Example 3, MA phases were coarsely formed by excessive hardenability during cooling after hot rolling to deteriorate burring properties in a low-temperature region.

(In Table 3, the number of complex precipitates refers to the number of coarse complex precipitates including at least one of Ti, Nb, Mo, and V, each having a diameter of 10 μm or more, observed within a unit area of $cm^2$, and the number of austenite phases refers to the number of austenite phases, each having a diameter of 10 μm or more, observed on grain boundaries within a unit area of $cm^2$. In Inventive Examples and Comparative Examples, except for the MA phases, the other phases are ferrite phases.)

As listed in Tables 1 to 3, in Comparative Examples 1 to 7, which did not satisfy one or more conditions of Relational Expressions 1 and 2, and Comparative Examples 8 and 9 in which alloying compositions and relational expressions sat- Comparative Examples 6 and 7 are cases which did not satisfy both Relational Expressions 1 and 2. In Comparative Example 6, a large amount of coarse complex precipitates and a large amount of coarse MA phases were formed on grain boundaries to deteriorate burring properties in a low-temperature region. In Comparative Example 7, a large amount of coarse carbides were formed by residual carbon (C), and a large amount of coarse MA phases were formed by hardenability alloying elements. Accordingly, it could be confirmed that burring properties were deteriorated in both a room-temperature region and a low-temperature region.

Comparative Examples 8 and 9 are cases in which a significantly low or high cooling rate was applied during force cooling immediately after coiling. In Comparative Example 8, coarse complex precipitates were excessively formed on grain boundaries. In Comparative Example 9, a large amount of coarse MA phases were formed. In both Comparative Examples 8 and 9, burring properties were deteriorated in a low-temperature region.

Meanwhile, Inventive Examples 1 to 5 are cases in which composition relationships (Relational Expressions 1 and 2) and manufacturing conditions were satisfactory as proposed in the present disclosure. In Inventive Examples 1 to 5, a desired microstructure was formed, and thus, excellent burring properties in a room-temperature region and a low-temperature region could be secured.

FIG. 1 is a graph illustrating HER (%)×TS(MPa) values in a room-temperature region and a low-temperature region of invention steels (Inventive Examples 1 to 5) and comparative steels (Comparative Examples 1 to 7). A hatched region is a range corresponding to inventive steels of the present disclosure.

The invention claimed is:

1. A steel sheet comprising, by wt %, carbon (C): 0.02 to 0.10%, silicon (Si): 0.01 to 0.30%, manganese (Mn): 1.0 to 1.7%, aluminum (Al): 0.01 to 0.10%, chromium (Cr): 0.005 to 0.2%, molybdenum (Mo): 0.005 to 0.3%, phosphorus (P): 0.001 to 0.05%, sulfur (S): 0.001 to 0.01%, nitrogen (N): 0.001 to 0.01%, niobium (Nb): 0.005 to 0.06%, titanium (Ti): 0.005 to 0.13%, vanadium (V): 0.005 to 0.2%, boron (B): 0.0003 to 0.002%, and a balance of iron (Fe) and inevitable impurities,
wherein [C]*, expressed by Relational Expression 1, satisfies −0.015 to 0.015, and Mn, Mo, Cr, and B satisfy Relational Expression 2,

[C]*=[C]−([C]×$A$)     (Relational Expression 1)

where $A$=(([Nb]/93)+([Ti]/48)+([V]/51)+([Mo]/96))/([C]/12), and each alloying component denotes a content by wt %,

[Mn]+(2.8[Mo])+(1.5[Cr])+(500[B])≤2.5     (Relation Expression 2)

where each alloying component denotes a content by wt %,
wherein a microstructure of the steel sheet comprises, by area fraction, 97% or more, including 100%, of a ferrite phase,
wherein a number of complex precipitates containing at least one of Ti, Nb, Mo, and V, each having a diameter of at least 10 μm, and observed within a unit area of 1 cm$^2$ is 1×10$^7$ or less, and
wherein a number of austenitic phase grains each having a diameter of 10 μm or more, and observed from grain boundaries within a unit area of 1 cm$^2$ is 1×10$^4$ or less.

2. The steel sheet of claim 1, wherein the microstructure further comprises, by area fraction, less than 3%, including 0%, of MA phases (a martensite phase and an austenite phase).

3. The steel sheet of claim 1, wherein the ferrite phase has an average grain size of 3 to 20 μm.

4. The steel sheet of claim 1, further comprising: a tensile strength of 590 MPa or more,
wherein a product of a hole expanding ratio (HER) and tensile strength (HER (%)×TS(MPa)) is 35000 MPa·% or more at a temperature of −30° C.

5. A method of manufacturing the steel sheet according to claim 1, the method comprising:
reheating a steel slab within a temperature range from 1200 to 1350° C., the steel slab comprising, by wt %, carbon (C): 0.02 to 0.10%, silicon (Si): 0.01 to 0.30%, manganese (Mn): 1.0 to 1.7%, aluminum (Al): 0.01 to 0.10%, chromium (Cr): 0.005 to 0.2%, molybdenum (Mo): 0.005 to 0.3%, phosphorus (P): 0.001 to 0.05%, sulfur (S): 0.001 to 0.01%, nitrogen (N): 0.001 to 0.01%, niobium (Nb): 0.005 to 0.06%, titanium (Ti): 0.005 to 0.13%, vanadium (V): 0.005 to 0.2%, boron (B): 0.0003 to 0.002%, and a balance of iron (Fe) and inevitable impurities,
wherein [C]*, expressed by Relational Expression 1, satisfies −0.015 to 0.015, and Mn, Mo, Cr, and B satisfy Relational Expression 2,

[C]*=[C]−([C]×$A$)     (Relational Expression 1)

where $A$=(([Nb]/93)+([Ti]/48)+([V]/51)+([Mo]/96))/([C]/12), and each alloying component denotes a content by wt %,

[Mn]+(2.8[Mo])+(1.5[Cr])+(500[B])≤2.5     (Relation Expression 2)

where each alloying component denotes a content by wt %;
finish-hot-rolling the reheated steel slab within a temperature range from 850 to 1150° C. to manufacture a hot-rolled steel sheet;
cooling the hot-rolled steel sheet to a temperature ranging from 550 to 700° C. at an average cooling rate of 10 to 70° C./s;
coiling the cooled hot-rolled steel sheet within a temperature range from 550 to 700° C.; and
forced-cooling the hot-rolled steel sheet at a cooling rate of 0.01 to 10° C./s after coiling.

6. The method of claim 5, the force-cooling after coiling is started within three hours immediately after the coiling.

7. The method of claim 5, further comprising:
oiling the forced-cooled hot-rolled steel sheet after being pickled.

8. The method of claim 7, further comprising:
performing hot-dip galvanizing such that the pickled hot-rolled steel sheet is heated to a temperature of 450 to 740° C.

9. The method of claim 8, wherein the hot-dip galvanizing is performed in a plating bath comprising, by wt %, magnesium (Mg): 0.01 to 30%, aluminum (Al): 0.01 to 50%, and a balance of zinc (Zn).

* * * * *